(12) United States Patent
Williamson et al.

(10) Patent No.: US 7,180,900 B2
(45) Date of Patent: Feb. 20, 2007

(54) COMMUNICATIONS SYSTEM EMBEDDING COMMUNICATIONS SESSION INTO ATM VIRTUAL CIRCUIT AT LINE INTERFACE CARD AND ROUTING THE VIRTUAL CIRCUIT TO A PROCESSOR CARD VIA A BACKPLANE

(75) Inventors: Harold K. Williamson, Tempe, AZ (US); Charles Christopher Hill, Gilbert, AZ (US); Brian A. Carr, Loughborough (GB)

(73) Assignee: Motorola, Inc., Schaumburg, IL (US)

( * ) Notice: Subject to any disclaimer, the term of this patent is extended or adjusted under 35 U.S.C. 154(b) by 877 days.

(21) Appl. No.: 10/367,045

(22) Filed: Feb. 14, 2003

(65) Prior Publication Data

US 2004/0162919 A1    Aug. 19, 2004

(51) Int. Cl.
*H04L 12/00* (2006.01)

(52) U.S. Cl. ............................ 370/395.61; 370/395.6; 709/238; 709/246

(58) Field of Classification Search ................ 709/238, 709/246; 370/432, 398, 420, 218, 395.61, 370/39.56
See application file for complete search history.

(56) References Cited

U.S. PATENT DOCUMENTS

| 5,844,887 | A * | 12/1998 | Oren et al. ................. 370/218 |
| 2002/0012355 | A1 * | 1/2002 | Czerwiec et al. ........... 370/420 |
| 2002/0097739 | A1 * | 7/2002 | Chen et al. ................. 340/432 |
| 2002/0181475 | A1 * | 12/2002 | Dove et al. ................. 370/398 |

* cited by examiner

*Primary Examiner*—Le Hien Luu
(74) *Attorney, Agent, or Firm*—Kevin D. Wills

(57) ABSTRACT

An improved system and technique for processing a communications session in a data communications system suitably includes the steps of receiving the communications session at a line interface card, embedding the communications session into an asynchronous transfer mode (ATM) virtual circuit at the line interface card, transporting the virtual circuit from the line interface card to a processor card via a backplane. The processor card suitably extracts the communications session from the virtual circuit, and processes the communications session as appropriate.

29 Claims, 3 Drawing Sheets

COMMUNICATIONS SYSTEM EMBEDDING COMMUNICATIONS SESSION INTO ATM VIRTUAL CIRCUIT AT LINE INTERFACE CARD AND ROUTING THE VIRTUAL CIRCUIT TO A PROCESSOR CARD VIA A BACKPLANE

FIELD OF THE INVENTION

This invention generally relates to data communications systems. More particularly, the invention relates to methods and apparatus for processing data across a backplane in a data communications system.

BACKGROUND OF THE INVENTION

As consumer demand for voice and data communications continues to increase, the need arises for improved data communications equipment capable of supporting faster data transmission speeds and greater bandwidth. Increasingly-capable voice processing systems, for example, are needed to manage high volumes of calls as well as associated voice mail, teleconferencing and the like. Moreover, improved media gateways are needed to process voice and data traffic and to convert the various types of voice and data traffic into appropriate formats. Various types of media gateways convert between the public switched telephone network (PSTN) protocols and internet protocols (IP), for example, or between PSTN and asynchronous transfer mode (ATM) or other protocols that are used by telecommunications carriers.

Many data communications systems such as media gateways and voice processing systems are frequently implemented with packet transport platforms such as the MXP series multi-service packet transport platform available from the Motorola Computer Group of Tempe, Ariz. These platforms typically include a cabinet with multiple slots for receiving various cards that are capable of performing one or more desired tasks. For example, a media gateway might include a line interface card that connects to an incoming data source (e.g a T1 line or a fiber connection), one or more data processing cards that process individual calls or connections, and one or more routing cards that route messages or connections across various media as appropriate. The various cards inserted into the slots in the cabinet are inter-connected by a backplane that allows connections and/or data to be transferred between the various components of the system. One type of backplane that is commonly used in many media gateway implementations is described in the Compact PCI (cPCI) standards, as defined by the PCI Industrial Computer Manufacturers Group (PICMG). cPCI backplanes typically operate according to the H.110 standard, which supports approximately four thousand simultaneous half-duplex connections (i.e. about 2,000 voice connections) using time domain multiplexing (TDM) techniques. TDM typically involves providing shared access to the backplane by providing each component with an allocated time slot during which the component is allowed to use the backplane. After the component's allocated time has elapsed, the component relinquishes the backplane so that other components may have access the resource.

Although backplane technologies such as H.110 and cPCI effectively transmit data signals within a data communications system, as the capability of various processing cards continues to increase, the demands of increased processing power can exceed the available capacity of the backplane. For example, many processing cards are now capable of processing approximately two thousand full-duplex connections on a single card. If multiple cards are used within a cabinet, additional bandwidth beyond that which is available from the H.110 standard is required to make full use of this capability.

Accordingly, it is desirable to create a new backplane technology that is capable of transmitting voice and/or data connections between cards operating within the cabinet at a faster data rate. Additionally, it is desirable to create a backplane data transport technique that is readily implemented with existing components and technologies to reduce costs and complexity. Furthermore, other desirable features and characteristics of the present invention will become apparent from the subsequent detailed description of the invention and any appended claims, taken in conjunction with the accompanied drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE DRAWINGS

The following detailed description of the invention is exemplary in nature and is not intended to limit the invention or the application and uses of the invention. Furthermore, there is no intention to be bound by any theory presented in the preceding background of the invention or the following detailed description of the drawings.

According to various exemplary embodiments, voice and data signals are transferred across a backplane within a data communications system using asynchronous transfer mode (ATM) or another appropriate packet-based technique on the backplane. Time domain multiplexed (TDM) data, for example, may be appropriately inter-worked into structured (or unstructured) mode ATM virtual circuits that can be distributed across the backplane using conventional ATM switching principals. By routing ATM data on the backplane instead of conventional TDM data, scalability for the system can be dramatically improved. Moreover, various embodiments may be implemented using conventional chips and components that are readily available and marketed toward ATM networks, thus reducing the cost of the system.

Figure 1:
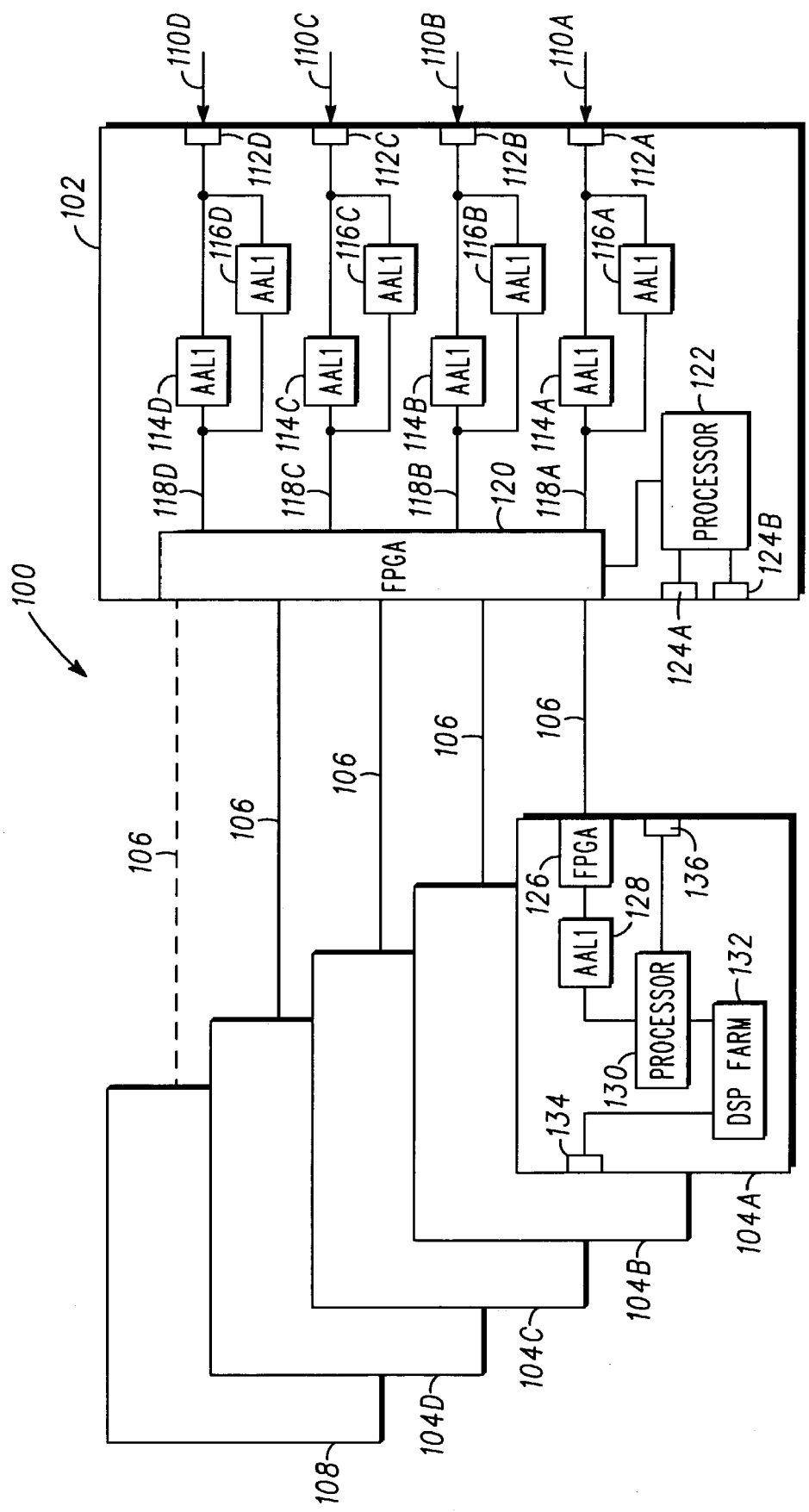
FIG. 1 is a block diagram of an exemplary data communications system using asynchronous transfer mode across a backplane.

With reference now to FIG. 1, an exemplary data communications system 100 suitably includes a line interface card 102 communicating with any number of processor cards 104A–D via a backplane 106 to process any number of voice and/or data connections. TDM signals 110A–D received at line interface card 102 are appropriately embedded within ATM cells or another packet-based format prior to transmission across backplane 106 as a virtual circuit (VC) or the like. One or more processing cards 104A–D suitably receives the VC and removes the ATM framing to extract and process the TDM data as appropriate.

Each of processing and interface cards communicating via backplane 106 may be housed within a conventional housing, chassis, rack, cabinet or other platform such as the MXP packet transport platform available from Motorola Inc. Backplane 106 suitably includes any bus or other interconnection between the various cards present within communications system 100. Backplane 106 may be implemented using a conventional cPCI serial mesh backplane (CSMB) (e.g. a PICMG version 2.20 backplane) as described in various publications available from PICMG and other sources.

Line interface card 102 is any card, system or other processing device capable of receiving data from an external connection 110 and of packaging the received data into a packet-based format for transmission on backplane 106. In an exemplary embodiment, line interface card 102 suitably supports one or more data channels, with each channel including a line interface 112 to a data connection 110 as well as one or more ATM encoding modules 114, 116 and a backplane interface 120. A control processor 122 may also be provided to manage data transfers through interface 120. Although FIG. 1 shows line interface card 102 as having four channels, alternate embodiments may include any number of input channels (e.g. one channel, two channels, eight channels, or the like). As used herein, like elements in differing data channels are identified with like reference numerals, with individual components being denoted with appended letters (e.g. "interfaces 112" or "interfaces 112A–D" refer to each of the line interfaces 112, whereas "interface 112C" refers to the particular interface 112 in the third data channel).

Data is received at external interfaces 112A–D from one or more external data connections 110A–D as appropriate. In various embodiments, data connections 110A–D may be OC3 connections to a SONET network. Alternatively, data 110 may be time domain multiplexed (TDM) data received from the public switched telephone network (PSTN) or another source over a fiber connection, coaxial cable, DS3 data connection or the like. Accordingly, interfaces 112A–D are any ports, receptacles or other interfaces to the input lines 110A–D as appropriate. In an exemplary embodiment, interface 112A–D is a fiber optic interface (e.g. to a SONET network) capable of receiving TDM signals with an automatic protection switch (APS) to provide redundancy for the connection.

Encapsulating modules 114A–D, 116A–D are any devices capable of encapsulating or converting data received that interfaces 112A–D into a packet-switched format such as ATM or the like. Encapsulating modules 114A–D and/or 116A–D suitably receive TDM data from interfaces 112A–D and automatically convert the data to an appropriate packet-based format (signals 118A–D) for routing on backplane 106. In an exemplary embodiment, TDM data is embedded within one or more asynchronous transfer mode AAL1 virtual connections (VCs) using the Universal Test & Operations PHY Interface for ATM (UTOPIA) format. Signals 118A–D, then, may be implemented as virtual circuits between encapsulating modules 112A–D across backplane 106 to one or more processor cards 104A–D. In an exemplary embodiment, encapsulating modules 114A–D, 116A–D are implemented with any of the various ATM encoder and/or decoder chips available from the Mindspeed Corp. of Irvine, Calif., PMC-Sierra, Inc. of Santa Clara, Calif. and many other suppliers. Although FIG. 1 shows each channel as having two encapsulating modules 114 and 116 to increase the data rate of interface 112, other embodiments may use a single module, or multiple modules as appropriate. In practice, any number of ATM processing modules 114, 116 may be used for each channel, and indeed one module 114/116 may simultaneously support multiple channels in alternate embodiments. Alternatively, each end of the ATM VC may include an ATM transmit encoder (ATM-TX) 114A–D and a separate ATM receive decoder (ATM-RX) 116A–D to support duplex communications.

Backplane interface 120 is any switch fabric, multiplexer, or other interface that is capable of receiving packet based signals 118A–D and of appropriately placing the signals on backplane 106 for transport to an appropriate data processing card 104A–D. In an exemplary embodiment, interface 120 is a switch fabric multiplexer made up of one or more field programmable gate arrays (FPGA) that suitably interconnect the various cards operating within system 100.

Data transported on backplane 106 from line interface card 102 is appropriately controlled by processor 122, which may be implemented with any controller, processor or other computing chip or device. Processor 122 appropriately monitors the status of the various processing cards 104A–D as well as the status of backplane 106. If one or more processing cards 104A–D fail for any reason, processing for that card can be rerouted to a backup card 108 installed within system 100 so that data communications capability is not lost during periods of maintenance or downtime. The various cards may also include one or more ETHERNET or other networking connections 124A–B so that system status and update messages may be shared between components of system 100 without using backplane 106.

Each data processing card 104A–D suitably receives the VCs from line interface card 102 via backplane 106, extracts the TDM data from the ATM VC format and processes the data as appropriate to handle a voice call, for example, or to implement a data connection or the like. Data processing cards 104A–D may also encode response data in an ATM or other packet-based format for transfer back to line interface card 102 and eventual transmission on one or more input lines 110. Each data processing card 104A–D suitably includes a backplane interface 126, an ATM/packet decoder 128, a processor 130, a signal processing farm 132, and optional interface 134 to a TDM or other high-speed data connection 134. Each processing card 104A–D may also include an interface 136 to an ETHERNET or other network separate from backplane 106 for control purposes.

Backplane interface 126 is any connection to backplane 106 such as an FPGA switch fabric as discussed above. In an exemplary embodiment, backplane interface 126 appropriately interfaces with the interface 120 on line interface card 102 to transfer ATM or other packet based data as appropriate.

Packet mode decoder 128 is any device or routine capable of extracting the TDM data from the ATM or other packet based header. Exemplary packet mode decoders include the ATM encoder/decoder components described above in connection with encoders 114, or 116. Alternately, the decoding function 128 may be implemented with software code executed by processor 130 or another component.

Signal processor farm 132 suitably includes any number of digital signal processors (DSPs) or other components capable of managing, handling and/or processing one or more data connections received at input lines 110A–D. In an exemplary embodiment, each DSP farm 132 on a processing card 104A–D suitably processes each of the DS0 connections received on a particular input channel 110A–D of line interface card 102. As mentioned above, although four data channels and four data processing cards 104A–D are shown in FIG. 1, any number of data processing cards (e.g. one, two, four, eight or any other number of cards) may be provided in various alternate embodiments. Moreover, it is not necessary that the number of processing boards 104 match the number of channels in line interface card 102, or that any data processing card 104A–D correspond to any particular channel 110A–D, although correspondence between data processing cards and input channels may occur in certain embodiments. Similarly, any number of backup cards 108 may also be provided to provide redundancy in the event that any data processing card 104A–D should fail, or if the card should go offline for maintenance or any other reason.

In operation, then, data input signals in TDM or another format are received via data connections 110A–D by line interfaces 112A–D, respectively. These signals are encoded into a packet-based format by modules 114A–D, 116A–D to create an ATM AAL1 virtual circuit between encoders 114A–D and decoders 128. The VC is established across backplane 106 between interfaces 120 and 126, acting in conjunction with processors 122 and 130, respectively.

Although ATM and circuit emulation technologies are generally intended for transporting data across a wide area or other network, ATM VCs may be routed on a backplane 106 using conventional ATM routing techniques as discussed herein. Routing and control in the exemplary embodiment shown in FIG. 1 is generally handled by processor 122 on line interface card 102 such that the DS0 or other data signals received on each channel 110 are provided to a processing card 104 as appropriate. If processor 122 discovers that one or more processing cards 104 are not available due to malfunction, maintenance or another reason, data signals intended for disabled card can be re-routed to a backup processing card 108 until the processing card becomes available. Status and control data about the various components of system 100 can be exchanged through an ETHERNET or other control network. Because data is transferred across backplane 106 in ATM or another packet-based format, the backplane is capable of transferring data at much higher speeds than previously used for TDM data. Accordingly, the throughput of the overall system 100 is greatly improved by using conventional ATM techniques within backplane 106.

Figure 2:
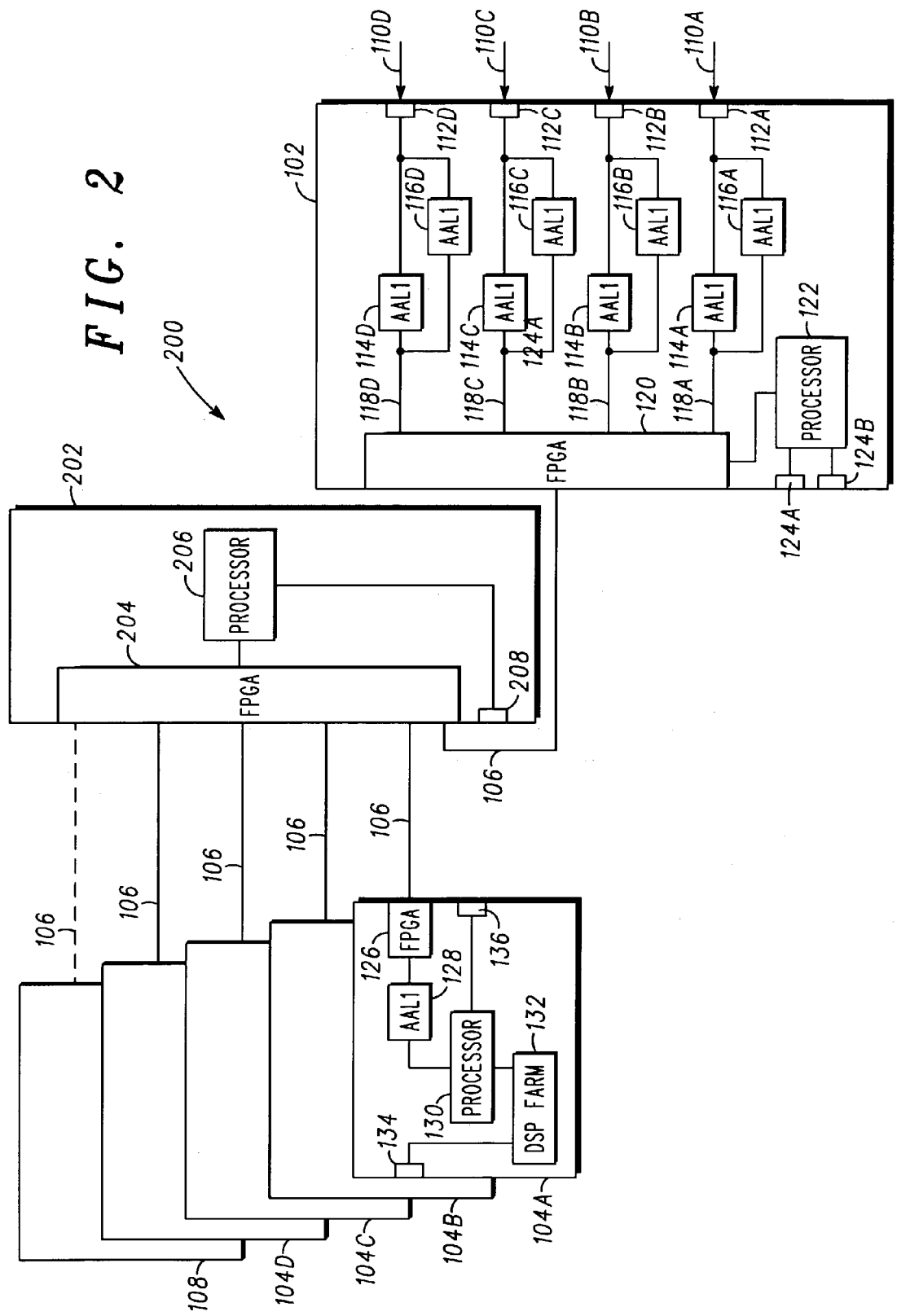
FIG. 2 is a block diagram of a second exemplary data communications system that includes an ATM router card.

With reference now to FIG. 2, an alternate embodiment of a data communications system 200 suitably includes an ATM routing card 202 interposed between line interface card 102 and data processing cards 104A–D. In this embodiment, routing of VCs between line interface card 102 and the various processing cards 104A–D is handled by routing card 202 rather than processor 122 on line interface card 102. In embodiments using a routing card 202, each of the VCs 118A–D are appropriately transmitted from line interface card 102 to routing card 202 via backplane 106. Routing card 202 suitably routes the various ATM VCs to one or more appropriate processing cards 104A–D using conventional ATM routing techniques.

In an exemplary embodiment, ATM routing board 202 is a packet processor resource board (PPRB) operating in a standard PICMG form factor as available from Motorola, Inc., of Tempe, Ariz. Such components may include optional ATM software executing on one or more processors to implement the routing function. ATM routing card 202 suitably includes an interface 204, a processor 206, and a networking port 208 (e.g. an ETHERNET port) for establishing control connections. Interface 204 is any FPGA or other switch fabric as discussed above, and processor 206 is any processor or group of processors capable of routing the various ATM circuits as appropriate. For example, the PPRB boards available from Motorola include a C-5 network processor as well as a Broadcom BCM 1250 MIPS processor to provide very high speed routing and control functions for a large number of simultaneous connections.

Although the routing card 202 typically occupies an additional slot on backplane 106 and adds additional cost and complexity to data communications system 200, various advantages may be obtained by using a separate ATM router to route VCs across backplane 106. First, line interface card 102 is relieved of the primary routing function, thus reducing the demands on processor 122. By allowing true routing of the VCs between the various processing cards 104A–D, additional functionality (e.g. teleconferencing) may be supported. Additionally, signal processing loading can be shared across data processing cards 104A–D even if the loads are unequal on input signals 110A–D by suitably routing the various VCs to data processing cards 104A–D having available processing bandwidth. Moreover, lawful intercepts, voice recording, and the like may be facilitated by simultaneously routing one or more VCs to a data processing card 104A–D as well as to a backup card 108 or other processing card.

Figure 3:
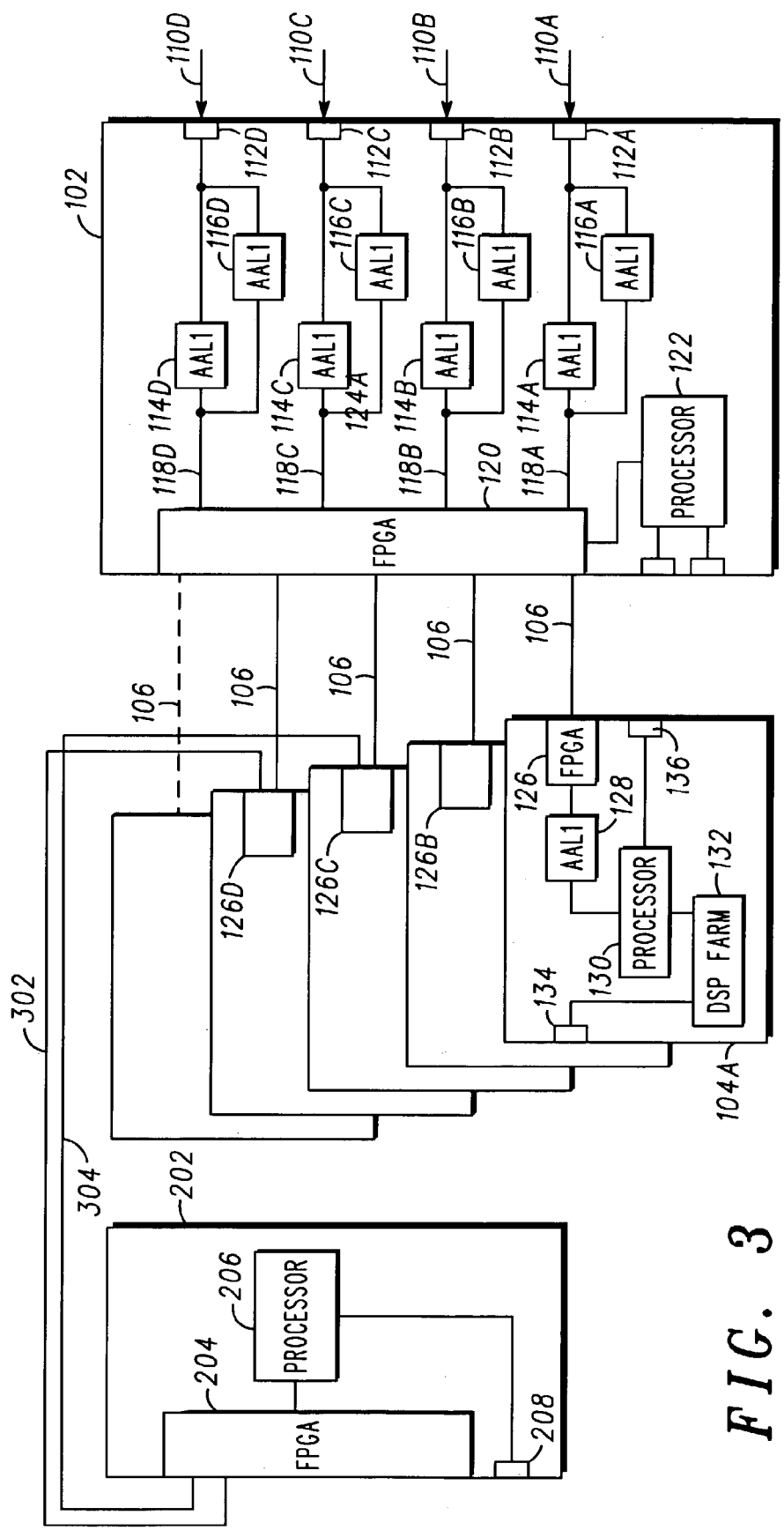
FIG. 3 is a block diagram of a third exemplary embodiment of a communications system that interfaces with an external high-speed connection.

With reference now to FIG. 3, a third exemplary embodiment of a data communications system 300 suitably includes a line interface card 102, as well as any number of data processing cards 104A–D as discussed above in conjunction with FIGS. 1 and 2. In a further embodiments however, one or more of the data processing cards 104A–D suitably includes a virtual circuit connection to an external ATM or other high speed data connection. In this case, when processor 130 is notified of a need for a lawful intercept, call recording, data communication or the like, processor 130 suitably establishes a virtual circuit 302, 304 to an external ATM processor 202 circuit. For example, connections 302, 304 maybe AAL1 connections to an external AAL2 connection supported by a separate PPRB communicating on backplane 106. Although this embodiment may require processor 130 to assume some routing functionality, it does eliminate the need for an additional routing card when an ATM connection board 302 is already present within system 300. Accordingly, the embodiment shown in FIG. 3 may be a low cost solution providing high functionality including lawful intercepts, recording, conferencing or the like.

While several exemplary embodiments have been presented in the foregoing detailed description, it should be appreciated that a vast number of equivalent variations exist. For example, although the techniques and devices have been primarily described in conjunction with structured mode ATM AAL1 data formats, the invention is not so limited. Equivalent embodiments could make use of unstructured mode ATM formats, for example, or other packet-based data transmission formats. In an unstructured-mode embodiment, TDM signals may be transparently encapsulated within conventional ATM headers and provided on the backplane along with associated framing information as appropriate. A clock signal may be provided along with the data stream, for example, and each of the data processing cards receiving unstructured-mode data may include additional processing to rebuild TDM or other data frames from unstructured ATM data.

Accordingly, the exemplary embodiments presented herein are intended as examples and are not intended to limit the scope, applicability, or configuration of the invention in any way. Rather, the foregoing detailed description provides a convenient road map for implementing exemplary embodiments of the invention. Various changes may be made in the function and arrangement of steps or elements described in any of the exemplary embodiments without departing from the scope of the invention as set forth in the appended claims and their legal equivalents.

What is claimed is:

1. A method of processing a communications session in a data communications system, the method comprising the steps of:
   receiving the communications session at a line interface card;
   embedding the communications session into an asynchronous transfer mode (ATM) virtual circuit at the line interface card;
   transporting the virtual circuit from the line interface card to a processor card via a backplane;
   extracting the communications session from the virtual circuit at the processor card; and
   processing the communications session at the processor card.

2. The method of claim 1 wherein the ATM virtual circuit is an AAL1 structured mode virtual circuit.

3. The method of claim 2 wherein the transporting step is executed by an ATM routing card coupled to the backplane.

4. The method of claim 3 further comprising the step of routing the virtual circuit to a second processor card.

5. The method of claim 4 further comprising the step of performing a lawful intercept of the communications session at the second processor card.

6. The method of claim 2 wherein the transporting step is executed by the line interface card.

7. A method of transferring data across a backplane within a computing device, the method comprising the steps of:
   receiving the data at an interface;
   forming a virtual connection to provide the data from the interface to a processor across the backplane using a packet format;
   extracting the data from the virtual connection at the processor; and
   processing the data at the processor.

8. The method of claim 7 wherein the packet format comprises an asynchronous transfer mode (ATM) format.

9. The method of claim 8 wherein the ATM format comprises structured AAL1 format.

10. The method of claim 8 wherein the ATM format comprises unstructured AAL1 format.

11. The method of claim 8 wherein the forming step comprises routing the virtual connection to the processor.

12. The method of claim 7 wherein the receiving and embedding steps are performed at a line interface card.

13. The method of claim 7 wherein the processing step comprises generating response data.

14. The method of claim 13 further comprising the steps of:
   embedding the response data into the packet format; and
   transmitting the response data to the interface using the virtual connection.

15. A processing system for processing a communications session, the system comprising:
   means for receiving the communications session;
   means for embedding the communications session into an asynchronous transfer mode (ATM) virtual circuit;
   means for routing the virtual circuit from a line interface card to a processor card via a backplane; and
   means for extracting the communications session from the virtual circuit at the processor card and for processing the communications session at the processor card.

16. The system of claim 15 wherein the receiving means is a line interface card.

17. The system of claim 16 wherein the embedding means is a chip on the line interface card.

18. The system of claim 15 wherein the routing means comprises an ATM routing card.

19. The system of claim 15 wherein the routing means comprises a backplane switch fabric.

20. The system of claim 15 wherein the extracting means is a processor card coupled to the backplane.

21. A system for processing a communications session, the system comprising:
   a line interface card having an interface configured to receive the communications session, a conversion chip configured to embed the communications session in an asynchronous transfer mode (ATM) virtual circuit, and a backplane interface;
   a processor card having a second backplane interface, a second conversion chip configured to extract the communications session from the virtual circuit, and a digital signal processor configured to process the communications session; and
   a backplane coupling the backplane interface of the line interface card to the second backplane interface of the processor card.

22. The system of claim 21 further comprising an ATM routing card coupled to the backplane and configured to route the virtual circuit from the line interface card to the processor card via the backplane.

23. The system of claim 22 further comprising a second processor card coupled to the backplane, the second processor card having a second digital signal processor configured to execute a legal intercept of the communications session.

24. The system of claim 22 further comprising a second processor card coupled to the backplane, the second processor card having a second digital signal processor configured to execute a conference call using the communications session.

25. A line interface card for processing a communications session in a communications system having at least one processor card and a backplane, the line interface card comprising:
   at least one interface to an external data communications line;
   an encoding processor configured to receive the communications session from the interface and to encapsulate the communications session into an asynchronous transfer mode (ATM) virtual circuit;
   a backplane interface configured to receive the virtual circuit from the encoding processor and to transmit the virtual circuit to the at least one processing card via the backplane.

26. The line interface card of claim 25 wherein the at least one interface is a time domain multiplexing (TDM) interface.

27. The line interface card of claim 25 wherein the ATM virtual circuit is a structured mode virtual circuit.

28. The line interface card of claim 25 wherein the ATM virtual circuit is an unstructured mode virtual circuit.

29. The line interface card of claim 25 wherein the backplane interface comprises a field programmable gate array (FPGA) switch fabric.

* * * * *